(12) United States Patent
Schneider et al.

(10) Patent No.: US 7,619,010 B2
(45) Date of Patent: Nov. 17, 2009

(54) METHOD FOR THE DISCONTINUOUS PRODUCTION OF SILICONE EMULSIONS

(75) Inventors: Otto Schneider, Burghausen (DE); Robert Schroeck, Altötting (DE)

(73) Assignee: Wacker Chemie AG, Munich (DE)

( * ) Notice: Subject to any disclaimer, the term of this patent is extended or adjusted under 35 U.S.C. 154(b) by 164 days.

(21) Appl. No.: 11/568,943

(22) PCT Filed: May 12, 2005

(86) PCT No.: PCT/EP2005/005201

§ 371 (c)(1),
(2), (4) Date: Nov. 10, 2006

(87) PCT Pub. No.: WO2005/111117

PCT Pub. Date: Nov. 24, 2005

(65) Prior Publication Data

US 2007/0225381 A1   Sep. 27, 2007

(30) Foreign Application Priority Data

May 13, 2004 (DE) .................. 10 2004 023 911

(51) Int. Cl.
*B01F 3/08* (2006.01)
*B01F 17/00* (2006.01)

(52) U.S. Cl. .......................... 516/53; 516/55
(58) Field of Classification Search .................. 516/53
See application file for complete search history.

(56) References Cited

U.S. PATENT DOCUMENTS

| 5,504,150 | A | 4/1996 | Gilson et al. |
| 5,629,388 | A | 5/1997 | Himelrick et al. |
| 5,726,270 | A | 3/1998 | Craig |
| 6,057,386 | A * | 5/2000 | Morita et al. .............. 523/212 |
| 6,140,414 | A | 10/2000 | Ohsawa et al. |
| 6,201,063 | B1 | 3/2001 | Halloran et al. |
| 6,252,100 | B1 | 6/2001 | Herzig |
| 6,964,753 | B2 * | 11/2005 | Gilson ..................... 422/108 |
| 2008/0064813 | A1 * | 3/2008 | Schneider ................. 524/837 |

FOREIGN PATENT DOCUMENTS

| CA | 2304644 A | 4/1999 |
| CN | 1271299 A | 10/2000 |
| DE | 19742759 A1 | 4/1999 |
| DE | 19814267 A1 | 4/1999 |
| DE | 19856075 A1 | 6/2000 |
| DE | 19960291 A1 | 7/2001 |
| EP | 0579458 B1 | 3/1997 |
| EP | 0780422 A2 | 6/1997 |
| EP | 1017745 B1 | 12/2001 |
| WO | WO 99/15263 * | 4/1999 |
| WO | WO 00/29465 | 5/2000 |
| WO | WO 0034359 A1 | 6/2000 |
| WO | WO 02/42360 A2 | 5/2002 |

OTHER PUBLICATIONS

Patbase Abstract corresponding to DE 198 14 267 A1.
Patbase Abstract corresponding to DE 197 42 759 A1.
Patbase Abstract corresponding to DE 199 60 291 A1.
Patbase Abstract corresponding to WO 00/29465.
Ullmann'Encyclopedia of Industrial Chemistry, CD-ROM-Edition, 2002, Wiley-VCH Verlag, Chapter "Emulsions" by Rudolf Heusch, Bayer AG.

* cited by examiner

*Primary Examiner*—Ling-Siu Choi
*Assistant Examiner*—Chun-Cheng Wang
(74) *Attorney, Agent, or Firm*—Brooks Kushman P.C.

(57) ABSTRACT

Organosilicon emulsions of improved quality are prepared batchwise in a circulating loop containing a high shear mixer, while controlling the temperature and pressure within the loop.

13 Claims, 1 Drawing Sheet

METHOD FOR THE DISCONTINUOUS PRODUCTION OF SILICONE EMULSIONS

CROSS-REFERENCE TO RELATED APPLICATION

This application is the U.S. national phase of PCT Appln. No. PCT/EP2005/005201 filed May 12, 2005, which claims priority to German application 10 2004 023 911.8 filed May 13, 2004.

BACKGROUND OF THE INVENTION 1. Field of the Invention

The invention relates to the batchwise preparation of aqueous emulsions which comprise organosilicon compound, emulsifier and water. 2. Description of the Related Art Silicone emulsions are commercially available as milky white macroemulsions in the form of water-in-oil (w/o) or oil-in-water emulsions and as opaque to transparent microemulsions. The emulsions are mixtures of at least one water-insoluble silane, silicone oil, silicone resin, silicone elastomer, or mixture thereof, at least one emulsifier, and water. For the preparation of the emulsion, these components are mixed with one another and dispersed with the use of, for example, heat and cold, mechanical shearing including that produced by means of narrow gaps in rotor-stator systems, colloid mills, microchannels, membranes, high-pressure homogenizers, jet nozzles and the like, or by means of ultrasound. Homogenizing apparatuses and processes are described, for example, in Ullmann's Encyclopedia of Industrial Chemistry, CD-ROM edition 2003, Wiley-VCH Verlag, under the keyword "Emulsions".

The silicone component of the emulsion can be prepared in an upstream reaction outside the emulsification unit and then dispersed in the emulsification unit. Alternatively, the silicone component of the emulsion can be produced in the emulsification unit itself (in situ preparation). Characteristic of the in situ preparation is that a chemical reaction takes place shortly before, during or shortly after the preparation of the emulsion.

All reactions customary in silicone chemistry, in particular those which lead to an increase in molecular weight, can be used for the in situ preparation or polymerization of the silicone component, for example chain extension or equilibration, polymerization, condensation or polyaddition reactions.

The emulsion polymerization of polysiloxanes having terminal OH groups with the aid of acidic catalysts, for example an acidic surfactant, is described in U.S. Pat. Nos. 6,140,414; 5,726,270; and 5,629,388. In U.S. Pat. No. 5,504,150, a phosphazene is used as the acidic catalyst. The base-catalyzed emulsion polymerization of cyclic polysiloxanes or polysiloxanes having terminal OH groups is described, for example, in U.S. Pat. No. 6,201,063.

Polyadditions or hydrosilylation reactions in emulsion are described, for example, in DE 198 56 075, U.S. Pat. No. 6,057,386 EP 1 135 429, and EP 780 422.

Polymerization reactions in emulsion which lead to branched liquid polysiloxanes are described, for example, in DE 199 60 291, and those which lead to branched elastomeric polysiloxanes are described, for example, in WO 00/34359.

In the preparation of silicone emulsions with the use of shearing, for example, the silicone or a silicone mixture is first mixed with at least one emulsifier and a small amount of water and exposed to high shearing, for example in a rotor-stator mixer having narrow gaps. A w/o emulsion having a very high viscosity forms as a so-called "stiff phase". The viscosity of this stiff phase is very greatly dependent on the shearing. This stiff phase is then slowly diluted with water to the inversion point. At the inversion point, the w/o emulsion becomes an 0/w emulsion. The formation of the stiff phase and the method of dilution with water to the desired final concentration of the emulsion determine the quality of the emulsion. Quality of the emulsion is to be understood in particular as meaning the particle size, the particle size distribution, the storage stability, and the tolerance of the emulsion to heating and/or cooling, vibrations, change of pH, change of salt content, etc.

The abovementioned preparation of silicone emulsions by means of shearing can be effected batchwise or continuously. The batchwise preparation is described, for example, in EP 579 458 A.

SUMMARY OF THE INVENTION

The invention relates to a batchwise process for the preparation of aqueous emulsions (E) which comprise organosilicon compound (A), emulsifier (B) and water, in which a preemulsion (V) of high viscosity is prepared from the organosilicon compound (A), the emulsifier (B) and water, and the preemulsion (V) is then diluted with further water, the pressures and temperatures being regulated during the process.

DETAILED DESCRIPTION OF THE PREFERRED EMBODIMENTS

Figure 1:
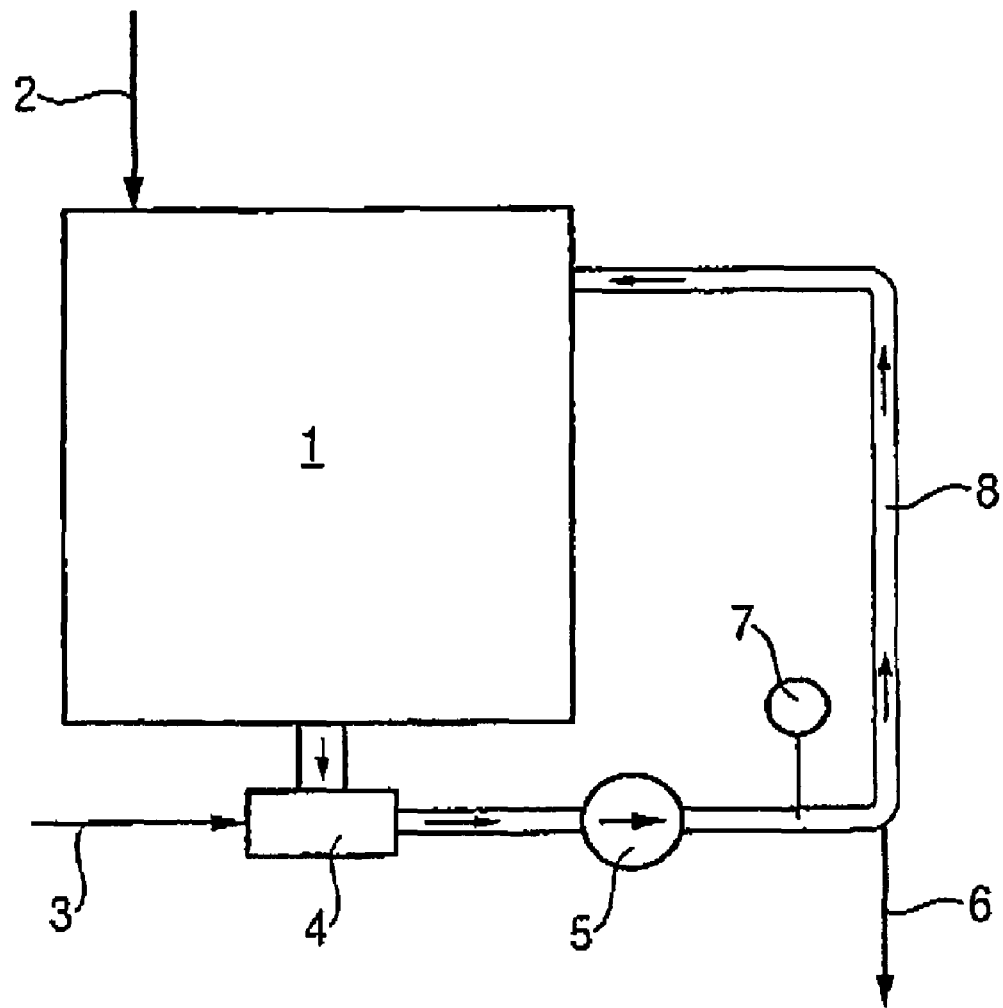
FIG. 1 illustrates one embodiment of the process of the subject invention.

It was found that the regulation of the pressures and temperatures in the individual process steps, in particular in the preparation of the preemulsion (V), is determinative for the quality of the emulsions (E). Regulation of these parameters substantially improves the quality of the emulsions (E) prepared. The regulation leads to clearer products having smaller particle sizes in the case of microemulsions. In the case of macroemulsions, substantially smaller particle sizes and improved storage and dilution stabilities are achieved. With temperature control, control of the particle sizes is possible. This effect is augmented by pressure regulation.

The process is explained by way of example with reference to FIG. 1. Emulsifier (B) and a part of the water are introduced into the vessel (1) and mixed. For mixing, the vessel (1) preferably contains at least one stirrer. The shearing mixer (4), for example a rotor-stator homogenizer, and the positively conveying pump (5), which may be, for example, a gear pump, a rotary piston pump or a rotary spindle pump, are started and the emulsifier/water mixture (EW) is circulated and passed through pipe (8) back into the vessel. The organosilicon compound (A) is metered into the vessel (1) through pipe (2) or (3). Preferably, the organosilicon compound (A) is slowly forced through pipe (3) directly into the shearing mixer (4) and mixed there with the emulsifier/water mixture (EW) and the mixture is recycled through pipe (8) into the vessel (1). During this process, the preemulsion with high viscosity (V) is produced. The dilution of the preemulsion (V) is effected with shearing and further addition of water in the shearing mixer (4). The addition of water is preferably effected through pipe (3), the mixture being circulated constantly through pipe (8) by pumping. Additives (Z) may be added through pipe (2) or (3), and the emulsion (E) can be adjusted to the desired final concentration and removed through pipe (6). Furthermore, it is possible to dilute the emulsion (E) further with water during removal through pipe (6), for example by means of an in-line mixer or in a downstream mixing tank, before the final product is filled into a transport or sales container.

It is particularly advantageous to use an additional pump (5) which is installed after the shearing mixer (4) in the direction of flow in order to control the circulation rate of the mixture and the pressure before and after the pump (5) and to regulate them in the desired range. Since the preemulsion (V) is exposed to shearing for a longer period of time at a low circulation rate in the shearing mixer (4), and hence energy is introduced for a longer period as well, the temperature of the preemulsion (V) increases at low circulation rates. Through the interplay of circulation rate, pressure regulation and temperature, the droplet size of the preemulsion (V) and emulsion (E) and the drop size distribution can be effectively controlled. This is very advantageous for the quality of the emulsion since a fine particle size and a narrow particle size distribution lead to increased stability of the emulsion (E).

The adjustment of the pressure in the range from 0.5 to 10 bar and of the temperature from 5 to 120° C. can be effected, for example, via the circulation rate of the pump (5) and can be determined at the measuring point (7). Pressures of 1.0 to 8 bar and temperatures of from 8 to 100° C. are preferred. Pressures of from 1.5 to 6 bar and temperatures of from 10 to 80° C. are particularly preferred.

Different pressures and temperatures occur before/after the pump (5), depending on preemulsion (V) and the viscosity thereof. Typically, the higher the viscosity of the preemulsion (V), the higher the pressure and the temperature.

During the entire process, the total system pressure in the apparatus is preferably from 0 to 6 bar absolute, preferably from 0.05 to 2 bar absolute and in particular from 0.1 to 1.5 bar.

In a preferred embodiment, in a first step, the emulsifier (B) is mixed with water to give an emulsifier/water mixture (EW) and, in a second step, the organosilicon compound (A) is added to the emulsifier/water mixture (EW) and the preemulsion (V) of high viscosity is prepared by shearing. Thereafter, in a third step, the preemulsion (V) is diluted with water.

In the preparation of the preemulsion (V), in particular in step 1 as described above, preferably not more than 50%, more preferably not more than 25%, and in particular not more than 10%, of the total water introduced into the emulsion (E) is used. The viscosity of the preemulsion (V) at 25°C is preferably from 40,000 to 5,000,000 mPa·s, in particular from 50,000 to 1,000,000 mPa·s.

In the second step, optionally one or more organosilicon compounds or mixtures thereof are added as organosilicon compound (A) and energy is introduced, in particular by shearing, for breaking up the particles. The shearing in the second step is effected by means of a shearing mixer, for example by means of a rotor-stator homogenizer. If desired, the added organosilicon compounds (A) can be reacted with themselves or with further substances. For this purpose, all reactions customary in silicone chemistry, in particular those which lead to an increase in the molecular weight, can be used, e.g. chain extension or equilibration, polymerization, condensation or polyaddition reactions. By means this process step of the in situ preparation, in particular emulsions of high molecular weight liquid, elastomeric, gel-like or solid organosilicon compounds (A) are obtainable.

In the process, the pressures are preferably regulated by the speed of the shearing mixer and the circulation rate of the pump. The regulation of the temperatures is preferably effected by means of the temperatures of the raw materials, the speed of the shearing mixer and the circulation rate of the pump.

The addition of the ingredients of the emulsion to the emulsification container is preferably effected directly in the region in which high shearing is produced by means of the shearing mixer.

In the third step, first water is added very slowly to the high-viscosity preemulsion (V), for example at a rate of addition of from 0.004%/sec to 0.1%/sec, in particular from 0.008%/sec to 0.05%/sec, based on the total amount of the final emulsion, thereafter, for example, at 0.015%/sec, preferably with shearing. If the water is better taken up by the emulsion, the rate of addition can be further increased.

In the third step or thereafter, other additives (Z), such as emulsifiers, thickeners, biocides and water-soluble or dispersible silicones, polysiloxanes or silanes and acid or alkalis for pH adjustment, can also be mixed in, and the solids content is adjusted to the desired value.

Preferably, water and an emulsifier (B) are initially introduced into an emulsification container, for example into a mixing vessel. The thorough mixing is preferably effected by means of conventional mixing tools, in particular wall-channeling stirrers, or by circulating the content of the emulsification container by pumping.

The emulsions (E) preferably have a content of organosilicon compound (A) of at least 1 to 99% by weight, more preferably from 1 to 75 % by weight, in particular from 9 to 80% by weight. The mean particle size measured by means of light scattering is in the range of from 0.001 to 100 μm, preferably from 0.002 to 1 μm. The pH can be varied from 1 to 14, preferably from 2 to 10, and most preferably from 3 to 9.

All silicones, siloxanes, polysiloxanes or silanes and mixtures, solutions or dispersions thereof can be used as organosilicon compound (A) in the process. Examples of (A) are linear organopolysiloxanes and silicone resins. Silicone resins are understood as meaning products which not only contain mono- and difunctional silicon units but also have tri- and tetrafunctional silicon units.

Organosilicon compound (A) is preferably liquid at 25° C. and preferably has a viscosity of from 0.5 to 100,000,000 mPa·s, more preferably from 0.5 to 500,000 mPa·s, and in particular from 2 to 80,000mPa·s.

An organosilicon compound (A) can be reacted in the process to give another organosilicon compound (A) (in situ preparation). The organosilicon compound (A) thus prepared may be a liquid, an elastomer or a solid at 25° C.

Examples of organosilicon compounds are organosilicon compounds which contain units of the general formula I

in which

R is a hydrogen atom or a monovalent, divalent or trivalent hydrocarbon radical having 1 to 200 carbon atoms, which may be substituted by halogen, amine, amide, ammonium, mercapto, acrylate, urethane, urea, carboxy or maleimide groups, X is a chlorine atom, a radical of the formula —O⁻ wherein protons and/or organic or inorganic ionic substances may be present to compensate the charges, a radical of the general formula —OR$^1$, or a radical of the general formula II

in which $R^1$ is a hydrogen atom or a hydrocarbon radical having 1 to 200 carbon atoms, which may be interrupted by one or more identical or different heteroatoms which are selected from O, S, N and P, $R^2$ is a divalent hydrocarbon radical having 1 to 200 carbon atoms, which may be interrupted by one or more groups of the formulae —C(O)—, —C(O)O—, —C(O)NR$^1$, —NR$^{1-}$, —$^{N+}$HR$^1$—, —O—, —S— and/or substituted by F, Cl or BR, $R^3$ may have a meaning of $R^1$ or is a radical of the formulae —C(O)R$^1$ or —Si(R$^1$)$_3$, A is a radical of the general formula IV $$—R^4(B)_z \quad \text{(IV)}$$

in which $R^4$ is a divalent, trivalent or tetravalent hydrocarbon radical having 1 to 200 carbon atoms per radical, which may be interrupted by one or more groups of the formulae —C(O)—, —C(O)O—, —C(O)NR$^5$, —NR$^5$—, —N$^+$HR$^5$—, —N$^+$R$^5$R$^5$—, —O—, —S—, —(HO)P(O)— or —(NaO)P(O)—and/or substituted by F, Cl or Br, in which $R^5$ is a hydrogen atom or a hydrocarbon radical having 1 to 200 carbon atoms per radical, which may be interrupted by one or more groups of the formulae —C(O)—, —C(O)O—, —C(O)NR$^5$—, —NR$^5$—, —N$^+$HR$^5$—, —N$^+$R$^5$R$^5$—, —O— or —S—and/or substituted by F, Cl or Br, B may have a meaning of $R^5$ or is a radical which is selected from —COO$^-$, —SO$_3-$, —OPO$_3$H$_y^{(2-y)}$—, —N$^+$R$^5$R$^5$R$^5$, —P$^+$R$^5$R$^5$R$^5$NR$^5$R$^5$, —OH, —SH, F, Cl, Br, —C(O)H, —COOH, —SO$_3$H, —C$_6$H$_4$—OH and —C$_m$F$_{2m+1}$,

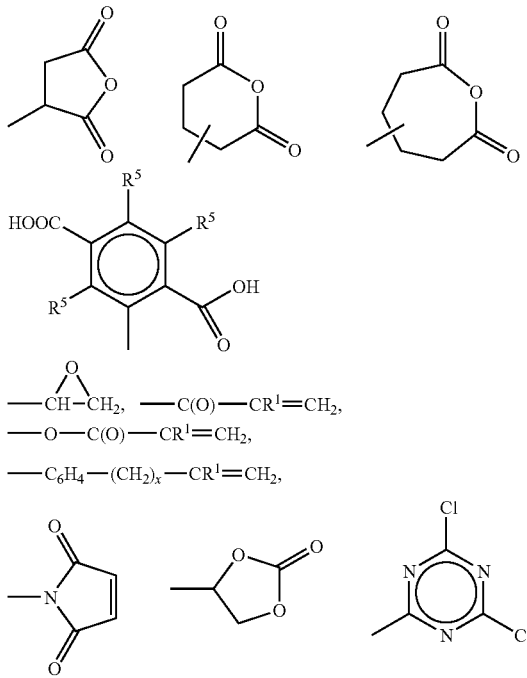

x is an integer of 1-20,
y has the values 0 or 1,
z has the values 1, 2 or 3, depending on the valency of $R^4$,
h has the values 0 or 1,
m is an integer of 1-20,
a, b and c each have the values 0, 1, 2, 3 or 4 and the sum a+b+c is less than or equal to 4 and
e, f and g are each an integer of 0-200, with the proviso that the sum e+f+g>1.

In the case of the silanes, a+b+c in the general formula I has a value of 4, and in the case of the siloxanes the units of the general formula I have an average value (a+b+c) of from 0 to 3.99.

Preferred polyorganosiloxanes are those which consist of from 10 to 50,000, preferably from 20 to 20,000, and most preferably from 50 to 10,000, units of the general formula I.

To compensate the charges of the radicals A, R and X, protons and/or organic or inorganic ionic substances can optionally be present, such as, for example, alkali metal, alkaline earth metal or ammonium ions, halide, sulfate, phosphate, carboxylate, sulfonate or phosphonate ions. Furthermore, the organosilicon compounds may optionally contain units of the general formulae (V) and (VI)

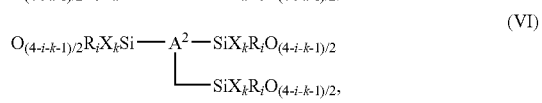

in which $A^2$ is a trivalent hydrocarbon radical having 1 to 200 carbon atoms, which may be interrupted by radicals of the formulae —C(O)—, —C(O)O—, —C(O)NR$^5$, —NR$^5$—, —N$^+$HR$^5$—, —N$^+$R$^5$R$^5$—, —O—, —S—, —N— or —N$^+$R$^5$— and/or substituted by F, Cl or Br, $A^1$ is a divalent radical $R^2$, i and k each have the values 0, 1, 2 or 3, with the proviso that i+k≦3 and R and X have the abovementioned meanings.

The abovementioned hydrocarbon radicals R, $R^1$, $R^2$, $R^3$, $R^4$, $R^5$, $A^1$ and $A^2$ may be saturated, unsaturated, linear, cyclic, aromatic or nonaromatic.

Examples of hydrocarbon radicals R are alkyl radicals, such as methyl, ethyl, n-propyl, isopropyl, 1-n-butyl, 2-n-butyl, isobutyl, tert-butyl, n-pentyl, isopentyl, neopentyl or tert-pentyl radical; hexyl radicals, such as the n-hexyl radical; heptyl radicals, such as the n-heptyl radical; octyl radicals, such as the n-octyl radical, and isoctyl radicals, such as the 2,2,4-trimethylpentyl radical; nonyl radicals, such as the n-nonyl radical; decyl radicals, such as the n-decyl radical; dodecyl radicals, such as the n-dodecyl radical; octadecyl radicals, such as the n-octadecyl radical; cycloalkyl radicals, such as the cyclopentyl, cyclohexyl or cycloheptyl radical and methylcyclohexyl radicals; aryl radicals, such as the phenyl, naphthyl, anthryl and phenathryl radical; alkaryl radicals, such as o-, m-, p-tolyl radicals; xylyl radicals and ethylphenyl radicals; and aralkyl radicals, such as the benzyl radical and the α- and the β-phenyl radical. The hydrogen atom or the methyl, ethyl, octyl and phenyl radical are preferred, and the hydrogen atom or the methyl and ethyl radical are particularly preferred.

Examples of halogenated radicals R are haloalkyl radicals, such as the 3,3,3-trifluoro-n-propyl radical, the 2,2,2,2',2',2'hexafluoroisopropyl radical, the heptafluoroisopropyl radical, and haloaryl radicals, such as the o-, — and p-chlorophenyl radicals.

Examples of radical R¹ are the examples stated for alkyl radicals R, and the methoxyethyl and the ethoxyethyl radical, radical R¹ preferably being alkyl radicals having 1 to 50 carbon atoms, which may be interrupted by oxygen atoms, particularly preferably the methyl and the ethyl radical.

Examples for organic or inorganic substances for compensating the charges for X=—O⁻ are alkali metal and alkaline earth metal ions, ammonium and phosphonium ions and monovalent, divalent or trivalent metal ions, preferably alkali metal ions, particularly preferably Na⁺ and K⁺.

Examples of radicals X are the methoxy or ethoxy radical and of the general formula (II), such as
—(CH₂)₃—(OCH₂CH₂)₃—OCH₃, —(CH₂)₃—(OCH₂CH₂)₆—OCH₃,
—(CH₂)₃—(OCH₂CH₂)₃₅—OCH₃,
—(CH₂)₃—(OCH(CH₃)CH₂)₃—OCH₃, —(CH₂)₃—(OCH(CH₃)CH₂)₆—OCH₃,
—(CH₂)₃—(OCH(CH₃)CH₂)₃₅—OCH₃, —(CH₂)₃—(OCH₂CH₂)₃—(OCH(CH₃)CH₂)₃—OCH₃,
—(CH₂)₃—(OCH₂CH₂)₆—(OCH(CH₃)CH₂)₆—OCH₃,
—(CH₂)₃—(OCH₂CH₂)₃₅—(OCH(CH₃)CH₂)₃₅—OCH₃,
—(CH₂)₃—(OCH₂CH₂)₃—OSi(CH₃)₃, —(CH₂)₃—(OCH₂CH₂)₆—OSi(CH₃)₃,
—(CH₂)₃—(OCH₂CH₂)₃₅—OSi(CH₃)₃,
—(CH₂)₃—(OCH₂CH₂)₃—OC(O)CH₃, —(CH₂)₃—(OCH₂CH₂)₆—OC(O)CH₃,
—(CH₂)₃—(OCH₂CH₂)₃₅—OC(O)CH₃,
—(OCH₂CH₂)₃—OH, —(OCH₂CH₂)₆—OH,
—(OCH₂CH₂)₃₅—OH,
—(OCH(CH₃)CH₂)₃—OH, —(OCH(CH₃)CH₂)₆—OH,
—(OCH(CH₃)CH₂)₃₅—OH, —(OCH₂CH₂)₃—(OCH(CH₃)CH₂)₃—OH,
—(OCH₂CH₂)₆—(OCH(CH₃)CH₂)₆—OH,
—(OCH₂CH₂)₃₅—(OCH(CH₃)CH₂)₃₅—OH;
—(OCH₂CH₂)₁₈—(O(CH₂)₄)₁₈—OH
—(OCH₂CH₂)₃—OCH₃, —(OCH₂CH₂)₆—OCH₃,
—(OCH₂CH₂)₃₅—OCH₃,
—(OCH(CH₃)CH₂)₃—OCH₃, —(OCH(CH₃)CH₂)₆—OCH₃,
—(OCH(CH₃)CH₂)₃₅—OCH₃, —(OCH₂CH₂)₃—(OCH(CH₃)CH₂)₃—OCH₃,
—(OCH₂CH₂)₆—(OCH(CH₃)CH₂)₆—OCH₃,
—(OCH₂CH₂)₃₅—(OCH(CH₃)CH₂)₃₅—OCH₃,
—(OCH₂CH₂)₃—OSi(CH₃)₃, —(OCH₂CH₂)₆—OSi(CH₃)₃,
—(OCH₂CH₂)₃₅—OSi(CH₃)₃,
—(OCH₂CH₂)₃—OC(O)CH₃, —(OCH₂CH₂)₆—OC(O)CH₃,
—(OCH₂CH₂)₃₅—OC(O)CH₃,
—(OCH₂CH₂)₃—OH, —(OCH₂CH₂)₆—OH,
—(OCH₂CH₂)₃₅—OH,
—(OCH(CH₃)CH₂)₃—OH, —(OCH(CH₃)CH₂)₆—OH,
—(OCH(CH₃)CH₂)₃₅—OH, —(OCH₂CH₂)₃—(OCH(CH₃)CH₂)₃—OH,
—(OCH₂CH₂)₆—(OCH(CH₃)CH₂)₆—OH,
—(OCH₂CH₂)₃₅—(OCH(CH₃)CH₂)₃₅—OH and
—(OCH₂CH₂)₁₈—(O(CH₂)₄)₁₈—OH.

Examples of radicals R² are linear or branched, substituted or unsubstituted hydrocarbon radicals having preferably 2 to 10 carbon atoms, saturated or unsaturated alkylene radicals being preferred and the ethylene and the propylene radical being particularly preferred.

Examples of radicals R³ are the examples stated for alkyl radical or aryl radical R, and radicals of the formula —C(O)R¹ or —Si(R¹)₃, the methyl, ethyl, propyl and butyl and trialkylsilyl and —C(O)-alkyl radical being preferred and the methyl, butyl, —C(O)—CH₃ and the trimethylsilyl radical being particularly preferred.

Examples of R⁴ are radicals of the formulae
—(CH₂)₃—
—(CH₂)₃—O—CH₂—
—(CH₂)₃—O—(CH₂—CH₂O)ₙ—
—(CH₂)₃—O—CH₂—CH(OH)—CH₂—
—(CH₂)₃—NH—(CH₂)₂—
—(CH₂)₃—NH—C(O)—
—(CH₂)₃—NH—(CH₂)₂—C(O)—O—
—(CH₂)₃—NH—(CH₂)₂—C(O)—O—(CH₂)₂—
—(CH₂)₃—NH—(CH₂)₂—NH—C(O)—CH=CH—
—(CH₂)₃—NH—C(O)—CH=CH—
—(CH₂)₃—C₆H₄—

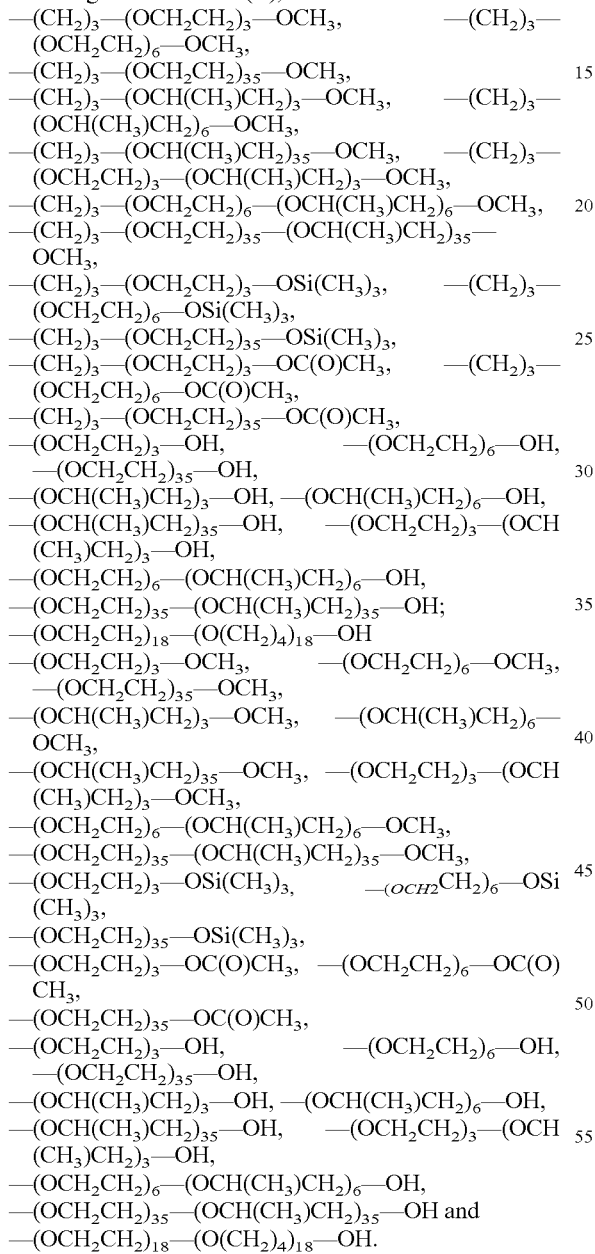

Preferred radicals R⁴ are those of the formulae
—(CH₂)₃—
—(CH₂)₃—NH—(CH₂)₂—
—(CH₂)₃—O—CH₂—CH(OH)—CH₂—

R⁴ is particularly preferably —(CH₂)₃— and —(CH₂)₃—NH—(CH₂)₂—.

Examples of R⁵ are the alkyl and aryl radicals mentioned above in the case of R and radicals of the formulae
—C(O)—CH₃
—(CH₂CH₂O)₃—CH₃, —(CH₂CH₂O)₆—CH₃,
—(CH₂CH₂O)₃₅—CH₃, —(CH(CH₃)CH₂O)₃—CH₃, —(CH(CH₃)CH₂O)₆—CH₃,
—(CH(CH₃)CH₂O)₃₅—CH₃, —(CH₂CH₂O)₃—(CH(CH₃)CH₂O)₃—CH₃,
—(CH₂CH₂O)₅—(CH₂—CH(CH₃)O)₅—CH₃,
—(CH₂CH₂O)₁₀—(CH₂—CH(CH₃)O)₁₀—CH₃,
—(CH₂CH₂O)₃—Si(CH₃)₃, —(CH₂CH₂O)₆—Si(CH₃)₃,
—(CH₂CH₂O)₃₅—Si(CH₃)₃,
—(CH₂CH₂O)₅—(CH₂—CH(CH₃)O)₅—Si(CH₃)₃,
—(CH₂CH₂O)₁₀—(CH₂—CH(CH₃)O)₁₀—Si(CH₃)₃,
—(CH₂CH₂O)₃—C(O)CH₃, —(CH₂CH₂O)₆—C(O)CH₃,
—(CH₂CH₂O)₃₅—C)O)CH₃,
—(CH₂CH₂O)₅—(CH₂—CH(CH₃)O)₅—C(O)CH₃,
—(CH₂CH₂O)₁₀—(CH₂—CH(CH₃)O)₁₀—C(O)CH₃,
—(CH₂CH₂O)₃—H, —(CH₂CH₂O)₆—H, —(CH₂CH₂O)₃₅—H,
—(CH(CH₃)CH₂O)₃—H, —(CH(CH₃)CH₂O)₆—H,
—(CH(CH₃)CH₂O)₃₅—H, —(CH₂CH₂O)₃—(CH(CH₃)CH₂O)₃—H,
—(CH₂CH₂O)₅—(CH₂—CH(CH₃)O)₅—H,
—(CH₂CH₂O)₁₀—(CH₂—CH(CH₃)O)₁₀—H and
—(CH₂CH₂O)₁₈—((CH₂)₄O)₁₈—H.

The hydrogen atom and the examples stated for R are preferred, and the hydrogen atom and alkyl radicals are particularly preferred.

Examples of radicals B are —COONa, —SO₃Na, —COOH, —SH and in particular —OH, —NH₂, —NH—CH₃, —NH—(C₆H₁₁) and —N—(CH₂—CH=CH₂)₂, with —NH₂, —NH—CH₃ and —NH—(C₆H₁₁) being particularly preferred.

Examples of A¹ are linear or branched, divalent alkyl radicals having preferably 2 to 20 carbon atoms, or radicals of the formulae —(CH₂)₃—NH—(CH₂)₃—, —(CH₂)₃—NR⁵—(CH₂)₃—
—(CH₂)₃—(CH₂—CH₂O)ᶠ—(CH₂)₃—
—O—(CH₂—CH₂O)ᶠ—

An example of A² is 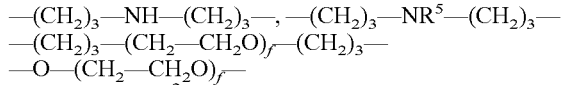

Organosilicon compounds (A) may also be formed from crude products during the process.

Preferred examples of organosilicon compounds (A) are linear trimethylsilyl- or hydroxydimethylsilyl-terminated polydimethylsiloxanes, such as, for example, oils having a viscosity of 50 mPa·s, comprising 96.5 mol % of (CH₃)₂SiO₂/₂ and 3.5 mol % of (CH₃)₃SiO₁/₂ or 96.5 mol % of (CH₃)₂SiO₂/₂ and 3.5 mol % of (CH₃)₂(OH)SiO₁/₂;

oils having a viscosity of 100 mPa·s, comprising 98 mol % of (CH₃)₂SiO₂/₂ and 2 mol % of (CH₃)₃SiO₁/₂ or 98 mol % of (CH₃)₂SiO₂/₂ and 2 mol % of (CH₃)₂(OH)SiO₁/₂;

oils having a viscosity of 1000 mPa·s, comprising 99.2 mol % of (CH₃)₂SiO₂/₂ and 0.8 mol % of (CH₃)₃SiO₁/₂ or 99.2 mol % of (CH₃)₂SiO₂/₂ and 0.8 mol % of (CH₃)₂(OH)SiO₁/₂; oils having a viscosity of 12 500 mPa·s, comprising 99.63 mol % of (CH₃)₂SiO₂/₂ and 0.37 mol % of (CH₃)₃SiO₁/₂ or 99.63 mol % of (CH₃)₂SiO₂/₂ and 0.37 mol % of (CH₃)₂(OH)SiO₁/₂;

oils having a viscosity of 100 000 mPa·s comprising 99.81 mol % of (CH₃)₂SiO₂/₂ and 0.19 mol % of (CH₃)₃SiO₁/₂ or 99.81 mol % of (CH₃)₂SiO₂/₂ and 0.19 mol % of (CH₃)₂(OH)SiO₁/₂.

Further preferred linear organosilicon compounds (A) are linear trimethylsilyl- or hydroxydimethylsilyl-terminated polydimethylsiloxanes which may contain, as additional terminal chemical groups or chemical groups in the chain, those having alkyl, alkenyl, aryl, amine, amide, ammonium, urethane, urea, carboxy, glycol, ether, ester, mercapto, fluoro or SiH functions.

Preferred examples of resin-like organosilicon compounds (A) are methylethoxy resins, for example of the formula CH₃Si(OC₂H₅)₀.₈(O)₁.₁; methyl resins, for example comprising 80 mol % of CH₃SiO₃/₂ and 20 mol % of (CH₃)₂SiO₂/₂ and having a molar mass of about 5000 g/mol or 98 mol % of CH₃SiO₃/₂ and 2 mol % of (CH₃)₂SiO₂/₂ and having a molar mass of about 5000 g/mol.

If the organosilicon compound (A) itself acts as an emulsifier, organosilicon compound (A) and emulsifier (B) can be identical. It is then possible to dispense with the addition of separate emulsifier (B).

The constituent (B) of the emulsions preferably comprises commercially available and currently investigated emulsifiers, such as, for example, sorbitan esters of fatty acids having 10 to 22 carbon atoms; polyoxyethylene sorbitan esters of fatty acids having 10 to 22 carbon atoms and an ethylene oxide content of up to 35 percent; polyoxyethylene sorbitol esters of fatty acids having 10 to 22 carbon atoms; polyoxyethylene derivatives of phenols having 6 to 20 carbon atoms on the aromatic and an ethylene oxide content of up to 95 percent; fatty amino- and amidobetaines having 10 to 22 carbon atoms; polyoxyethylene condensates of fatty acids or fatty alcohols having 8 to 22 carbon atoms with an ethylene oxide content of up to 95 percent; ionic emulsifiers, such as alkylaryl sulfonates having 6 to 20 carbon atoms in the alkyl group; fatty acid soaps having 8 to 22 carbon atoms; fatty sulfates having 8 to 22 carbon atoms; alkyl sulfonates having 10 to 22 carbon atoms; alkali metal salts of dialkylsulfosuccinates; fatty amine oxides having 10 to 22 carbon atoms; fatty imidazolines having 6 to 20 carbon atoms; fatty amidosulfobetaines having 10 to 22 carbon atoms; quaternary emulsifiers, such as fatty ammonium compounds having 10 to 22 carbon atoms; fatty morpholine oxides having 10 to 22 carbon atoms; alkali metal salts of carboxylated, ethoxylated alcohols having 10 to 22 carbon atoms and up to 95 percent of ethylene oxide; ethylene oxide condensates of fatty acid monoesters of glycerol having 10 to 22 carbon atoms and up to 95 percent of ethylene oxide; mono- or diethanolamides of fatty acids having 10 to 22 carbon atoms; phosphate esters; organosilicon compounds (A) which have units of the general formula I, in which X is a radical of the general formula II and c is at least 1.

As is well known in the area of emulsifiers, the counter ions in the case of anionic emulsifiers can be alkali metals, ammonia or substituted amines, such as trimethylamine or triethanolamine. Usually, ammonium, sodium and potassium ions are preferred. In the case of cationic emulsifiers, the counter ion is a halide, sulfate or methylsulfate. Chlorides are the most industrially available compounds.

The abovementioned fatty structures are usually the lipophilic half of the emulsifiers. A customary fatty group is an alkyl group of natural or synthetic origin. Known unsaturated groups are the oleyl, linoleyl, decenyl, hexadecenyl and dodecenyl radicals. Alkyl groups may be cyclic, linear or branched. Other possible emulsifiers are sorbitol monolaurate/ethylene oxide condensates; sorbitol monomyristate/ethylene oxide condensates; sorbitol monostearate/ethylene oxide condensates; dodecylphenol/ethylene oxide condensates; myristylphenol/ethylene oxide condensates; octyl-phenyl/ethylene oxide condensates; stearyl-phenol/ethylene oxide condensates; lauryl alcohol/ethylene oxide condensates; stearyl alcohol/ethylene oxide condensates; decylaminobetaine; cocoamidosulfobetaine; olylamidobetaine; cocoimidazoline; cocosulfoimidazoline; cetylimidazoline; 1-hydroxyethyl-2-heptadecenylimidazoline; n-cocomorpholine oxide; decyldimethylamine oxide; cocoamidodimethylamine oxide; sorbitan tristearate having condensed ethylene oxide groups; sorbitan trioleate having condensed ethylene oxide groups; sodium or potassium dodecyl sulfate; sodium or potassium stearyl sulfate; sodium or potassium dodecylbenzenesulfonate; sodium or potassium stearylsulfonate; triethanolamine salt of dodecylsulfate; trimethyldodecylammonium chloride; trimethylstearylammonium methosulfate; sodium laurate; sodium or potassium myristate.

It is also known that it is possible to use inorganic solids as emulsifiers (B). These are, for example, silicas or bentonites, as described in EP 1017745 A or DE 19742759 A.

The nonionic emulsifiers are preferred. The constituent (B) may consist of an abovementioned emulsifier or of a mixture of two or more abovementioned emulsifiers and can be used in pure form or as solutions of one or more emulsifiers in water or organic solvents.

Emulsifiers (B) are preferably used in amounts of from 0.1 to 60% by weight, more preferably from 1 to 30% by weight, based in each case on the total weight of organosilicon compounds (A).

Examples of silanes are vinyltris(methoxyethoxy)silane, tetraethoxysilane, partially hydrolyzed tetraethoxysilane, methyltriethoxysilane, partially hydrolyzed methyltriethoxysilane, aminoethylaminopropyltrimethoxysilane, aminoethylaminopropyl(methyl)dimethoxysilane.

All above symbols of the above formulae have their meanings in each case independently of one another. In all formulae, the silicon atom is tetravalent.

In the following examples, all quantity and percentage data are based on weight, unless stated otherwise, all temperatures are 20° C. and all pressures are 1.013 bar (abs.). All viscosities are determined at 25° C.

EXAMPLES

Example 1a (According to the Invention)

Preparation of a Clear Emulsion of an Aminofunctional Polysiloxane 1.60% of isotridecyl alcohol ethoxylate having on average 8 EO (Arylpon® IT 8), 4.14% of isotridecyl alcohol ethoxylate having on average 5 EO (Lutensol® TO 5), 0.2% of acetic acid (80% strength) and 3.93% of demineralized water (temperature 12° C., the temperature is regulated to +/−2 K) are initially introduced into a vessel. The mixing vessel is thermostated at 40° C. and the homogenizer at 2000 rpm, and the stirrer and the circulation pump are switched on. Thereafter, 16.25% of aminofunctional silicone oil (Wacker® Finish WR 1300) at a temperature of 20° C. are fed through pipe (3) at a rate of 1%/min, based on the end amount of emulsion. A thick phase forms. The pressure in the circulation pipe is about 4 bar and the temperature 45° C. Thereafter, 70.5% of demineralized water (12° C.) are metered in, beginning at 0.02%/sec, based on the end amount of emulsion. Finally, 0.08% of preservative (Kathon® LXE) and 3.5% of glycerol are metered.

This leads to a clear silicone emulsion having a particle size of 20 nm and a turbidity of 10 ppm. The emulsion remains stable for several months at a storage temperature of 50° C.

Comparative Example 1b (Not According to the Invention)

If the analogous process conditions as stated under example 1 are chosen but the process is not carried out according to the invention but the aminofunctional silicone oil is metered at room temperature (20° C.) and the mixer is not thermostated, this leads to a substantial temperature drop to about 30° C., but the pressure remains substantially unchanged since a stiff phase having a high viscosity as in example 1 did not form. The product prepared has a substantially larger particle size of 42 nm and a turbidity of 23 ppm. On storage at 50° C., phase separation is found after 3 weeks.

Example 2a (According to the Invention)

Preparation of a Silicone Resin Emulsion Stabilized with Polyvinyl Alcohol 35.3% of polyvinyl alcohol solution (10% strength) (25° C., the temperature is kept constant at +/−2 K) are initially introduced into a container. The stirrer and circulation pump are switched on and the homogenizer is set at 2000 rpm. The container temperature is regulated to 15° C. Thereafter, 48.4% of a mixture of silicone resin (80 mol % of T units, 20 mol % of D units, 20° C.) and an OH-terminated polydimethylsiloxane having a viscosity of 30 mPa·s are fed through pipe (3) at a rate of addition of 1%/min, based on the end amount of emulsion. The pressure in the circulation pipe is 2 bar and the temperature not more than 37° C. This is followed by addition of 16.06% of demineralized water (12° C.), beginning at 0.02%/sec, based on the end amount of emulsion, and 0.24% of preservative (Rocima® 523), and the mixture is homogenized for 5 minutes. Using the specified process parameters, an emulsion which has a storage stability of 1 year at room temperature without phase separation is produced.

Comparative Example 2b (Not According to the Invention)

The process of Example 2a is repeated, except the temperature of the polyvinyl alcohol solution, in a manner inconsistent with the present invention, is not monitored, and increases to 50°. The container is not cooled, and the temperature in the circulation pipe increases to about 45° C. The produce obtained shows substantial deposition of silicone resin after storage for only 2 weeks at room temperature.

Example 3a (According to the Invention)

Hydrosilylation in Emulsion 1.7% of water (12° C.) and 3.2% of an isotridecyl alcohol ethoxylate of the average formula $C_{13}H_{27}O(C_2H_4O)_{10}H$ are introduced into a container. The stirrer and the circulation pump are switched on and the homogenizer is set at 2000 rpm. The container temperature is regulated to 15° C. 45% of a mixture of trivinylcyclohexane and $HMe_2Si—(OSiMe_2)_x—H$, where the molar ratio of C=C to SiH is 1.75, are metered in via pipe (3) at a temperature of 13° C. in the course of 30 minutes. The components are mixed until a very highly viscous phase forms. The circulation speed in the case of the highly viscous phase is set to high by means of pump (5), the temperature at the measuring point (7) is 29° C. and the pressure in the circulation pipe is 2.7 bar.

Thereafter, 10 ppm of platinum in the form of a Karstedt catalyst solution having a Pt content of 1.1% by weight (platinum-1,3-divinyl-1,1,3,3-tetramethyl-disiloxane complex according to U.S. Pat. No. 3,775,452) are incorporated as reaction catalyst for the hydrosilylation reaction and the highly viscous phase is then immediately diluted with 50.1% of distilled water, which is metered in through pipe (3), beginning at a rate of addition of 0.01%/sec, based on the end amount of emulsion, to give a milky white, smooth emulsion.

The resulting homogeneous emulsion has a mean particle size of 202 nm and a storage stability of more than 9 months.

The silicone polymer isolated from the emulsion by addition of acetone has a viscosity of 14,550 mPa·s at 25° C.

Comparative Examples 3b (Not According to the Invention)

The experiment is carried out as described under example 3a, but the raw materials for the emulsion are metered in at 25° C. The emulsification is carried out without pump (5). The temperature at the measuring point (7) is 17° C. higher than in 3a. The resulting emulsion is inhomogeneous and has coarse, rubber-like particles which accumulate at the top within a day. The emulsion therefore does not have sufficient storage stability. The particle size is 274 nm. The particle size distribution has several maxima.

The invention claimed is:

1. A batchwise process for the preparation of aqueous emulsions of organosilicon compounds having a targeted organosilicon compound content, comprising:
    a) establishing a fluid circulation loop having a directional flow and containing a stirred fluid reservoir, at least one high shear mixer, and at least one pump positioned between the stirred fluid reservoir and the high shear mixer(s), and following the high shear mixer(s) in the direction of flow;
    b) introducing an aqueous phase containing an emulsifier into said fluid reservoir;
    c) circulating a portion of the aqueous phase and an emulsifier in the circulation loop;
    d) adding one or more organosilicon compounds to said aqueous phase and circulating within said circulation loop to form a stiff phase preemulsion;
    e) diluting said stiff phase preemulsion with additional aqueous phase added prior to said high shear mixer, and
    e) withdrawing an aqueous emulsion product with said targeted organosilicon compound content,
wherein temperature and pressure in the circulation loop is monitored and adjusted to target temperature and pressure, wherein the temperature of the aqueous phase is regulated to a target temperature by at least one of regulating the temperature of raw material supplied to the fluid reservoir, regulating the temperature of raw materials introduced directly into the high shear mixer, regulating the speed of the high shear mixer, and regulating the circulation rate of the pump located following the high shear mixer and between the high shear mixer and the fluid reservoir, and wherein pressure on the inlet and outlet sides of the high shear mixer is regulated by at least one of adjusting the speed of the mixer and adjusting a circulation rate by means of the pump, wherein the high shear mixer is a rotor stator mixer.

2. The process of claim 1, wherein the aqueous phase introduced into the fluid reservoir comprises not more than 25 weight percent of the water present in the aqueous emulsion product.

3. The process of claim 1, where the viscosity of the stiff phase preemulsion at 25° C. is between 40,000 mPa·s and 5,000,000 mPa·s.

4. The process of claim 2, where the viscosity of the stiff phase preemulsion at 25° C. is between 40,000 mPa·s and 5,000,000 mPa·s.

5. The process of claim 2, wherein the temperature is regulated to a temperature in the range of 10° C. to 80° C.

6. The process of claim 1, wherein at least one organosilicon compound is a reactive organosilicon compound which reacts in situ to provide a different organosilicon compound.

7. The process of claim 1, wherein the organosilicon compound is a liquid at 25° C. with a viscosity of from 0.5 mPa·s to 100,000,000 mPa·s.

8. The process of claim 1, wherein said fluid reservoir has a volume sufficient to contain the entire aqueous emulsion product, and the preemulsion and the diluted preemulsion are continuously circulated through the circulation loop until a homogeneous aqueous product emulsion has formed, and the aqueous product emulsion is then withdrawn from the circulation loop.

9. The process of claim 1, further comprising selecting a target temperature of fluid in the circulation loop, including at least one temperature sensor in the circulation loop, monitoring the temperature of fluid contained in the circulation loop, and adjusting the temperature to maintain the target temperature.

10. The process of claim 1, wherein the circulation loop further comprises a pressure measuring point, and wherein the pressure in the circulation loop is altered to vary the residence time in the rotor stator mixer.

11. The process of claim 10, wherein a residence time in the high shear mixer is adjusted to obtain a target droplet size and droplet size distribution.

12. The process of claim 1, wherein a single rotor stator mixer is employed.

13. The process of claim 5, wherein the temperature is regulated at least in part by varying at least one of the circulation rate and the speed of the rotor stator mixer.

* * * * *

UNITED STATES PATENT AND TRADEMARK OFFICE
CERTIFICATE OF CORRECTION

PATENT NO. : 7,619,010 B2  Page 1 of 1
APPLICATION NO. : 11/568943
DATED : November 17, 2009
INVENTOR(S) : Otto Schneider et al.

It is certified that error appears in the above-identified patent and that said Letters Patent is hereby corrected as shown below:

Column 14, Line 15, Claim 5:

Delete "The process of claim 2" and insert:
-- The process of claim 1 --.

Signed and Sealed this

Sixteenth Day of February, 2010

David J. Kappos
*Director of the United States Patent and Trademark Office*